No. 725,817. PATENTED APR. 21, 1903.
L. W. BATES.
CUTTER FOR DREDGES.
APPLICATION FILED OCT. 19, 1900.
NO MODEL. 2 SHEETS—SHEET 2.

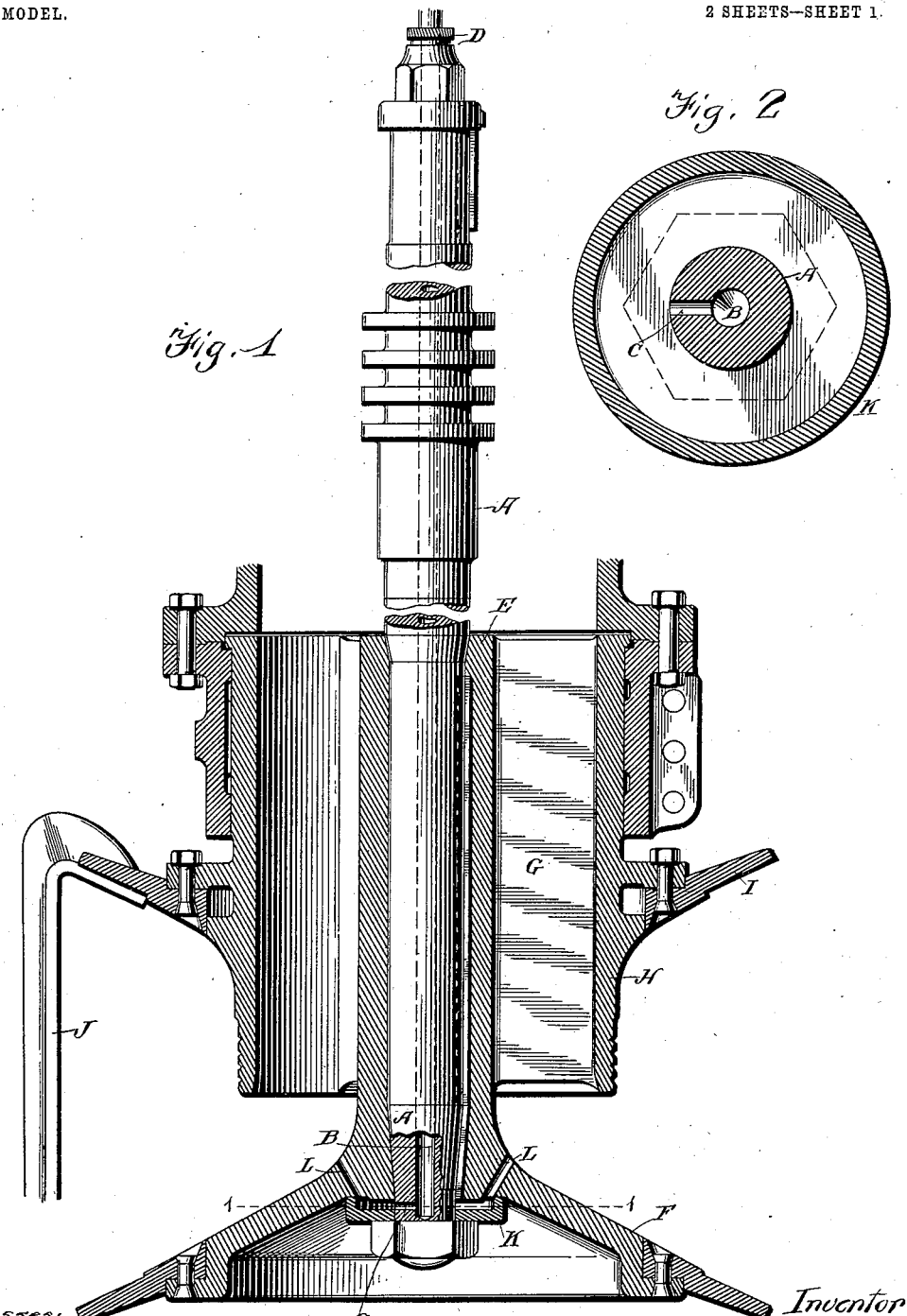

Witnesses:

Inventor.
Lindon W. Bates,
by Dodge and Sons,
Attorneys.

United States Patent Office.

LINDON WALLACE BATES, OF CHICAGO, ILLINOIS.

CUTTER FOR DREDGES.

SPECIFICATION forming part of Letters Patent No. 725,817, dated April 21, 1903.

Application filed October 19, 1900. Serial No. 33,549. (No model.)

*To all whom it may concern:*

Be it known that I, LINDON WALLACE BATES, a citizen of the United States, residing at Chicago, in the county of Cook and State of Illinois, have invented certain new and useful Improvements in Cutters for Dredges, of which the following is a specification.

My present invention pertains to cutters for dredges, the construction and advantages of which will be hereinafter set forth, reference being had to the annexed drawings, wherein—

Figure 3:
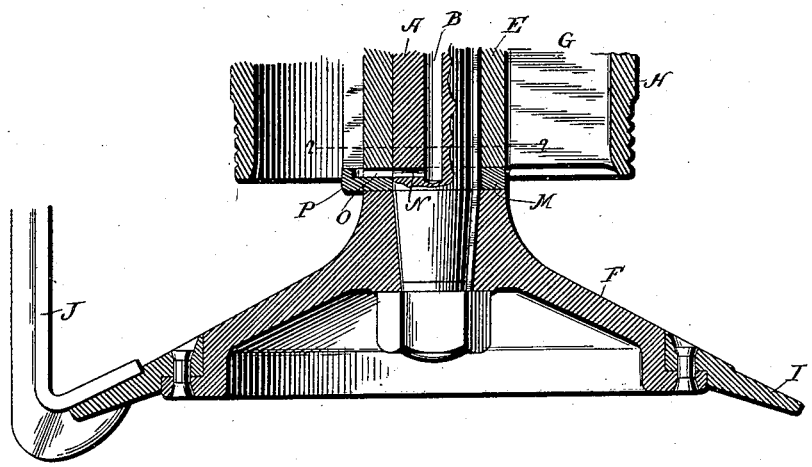

Figure 1 is a vertical longitudinal sectional view of the cutter; Fig. 2, a transverse sectional view of a portion of the cutter on the line 1 1 of Fig. 1; Fig. 3, a view similar to Fig. 1, showing a modified construction; and Fig. 4, a cross-sectional view on the line 2 2 of Fig. 3.

The object of my invention is to provide an improved rotary cutter wherein a water-jet is employed to keep the cutter free of accumulated material, and consequently to permit the suction-pump to have a continuous and uninterrupted action.

The particular form of cutter employed is immaterial to the present invention, that illustrated, however, being found in practice efficacious and is here shown for the purpose of setting forth the invention.

Referring to the drawings, A denotes the shaft or spindle, having a longitudinally-extending opening or passage B formed therein, with a communicating lateral opening or openings C near its lower end. The upper end of the passage B is connected, by means of a suitable stuffing-box D or the like, to a main supplied with water under pressure.

In the form illustrated the cutter, generally speaking, comprises a sleeve E, keyed fast to the spindle and formed at its lower end with an inclined disk-shaped piece F, while the upper end of the sleeve has ribs or webs G extending therefrom and supporting the outer sleeve or collar H of the cutter. Suitable rings I I are connected to the disk and outer collar, and these in turn form the support for the cutter-blades J.

No claim is herein made to the special form of cutter *per se*, as that forms the basis of my pending application, filed January 18, 1900, Serial No. 1,906.

To the lower end of the spindle or shaft A there is secured a hollow disk or cup K, into which opens the passage or channel C. Suitable passages or openings L extend in an upwardly direction through the disk or portion F from the cup K, from which construction it will be seen that the water which is forced from the main through channels B and C finds its way into the cup or hollowed disk and finally is projected with force up into the hollow cutter. The water thus projected in jets or streams under pressure will effectually prevent the cutter from becoming clogged and at the same time to a greater or less degree disintegrate the material passing therethrough.

Figure 4:
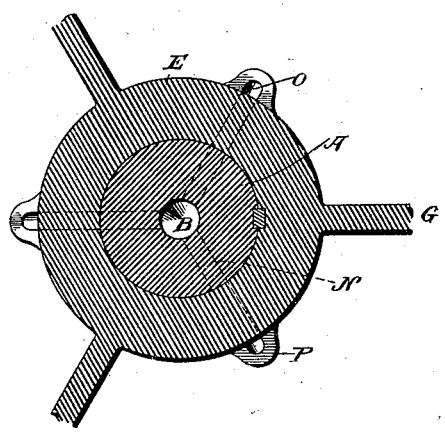

In Figs. 3 and 4 is illustrated a modified construction wherein instead of mounting the disk or washer below the lower member of the cutter the said member is made as an independent piece and a collar M secured on the shaft intermediate the sections of the cutter. Any suitable means, such as a key, may be employed to insure rotation of the collar with the shaft.

Radially-extending passages or channels N extend from the lower end of the main channel in the shaft and communicate with similar channels O in the collars, said channels O terminating and opening upwardly in projections P, formed on the collar. The parts are so positioned that the openings come midway between the ribs, and consequently the water-jets act to the best advantage to accomplish the end in view.

Having thus described my invention, what I claim is—

1. A rotary cutter for suction-dredges provided with a series of water-jets directed toward the interior of the cutter into the path of material passing therethrough.

2. A rotary cutter for suction-dredges provided with a series of water-jets acting in the same direction as the passage of the material through said cutter.

3. A rotary cutter for suction-dredges in combination with means for directing a series of water-jets into the interior thereof in a direction substantially the same as that of the material passing through the cutter.

4. In combination with a shaft having an opening or passage formed therein; a hollow cutter mounted on said shaft; and means in communication with said passage for directing a series of water-jets up through the cutter.

5. In combination with a shaft having an opening or passage formed therein; a hollow cutter mounted on said shaft; and a cup also mounted on the shaft below the cutter, said cup communicating with the passage in the shaft; and a series of openings extending upwardly through the lower member of the cutter.

In testimony whereof I have signed my name to this specification in the presence of two subscribing witnesses.

LINDON WALLACE BATES.

Witnesses:
WM. O. BROWN,
H. MAYKELS.